Aug. 8, 1939.   P. F. PEYRUQUEOU   2,168,715
SERVO-CLUTCH
Filed Feb. 15, 1930   3 Sheets-Sheet 2

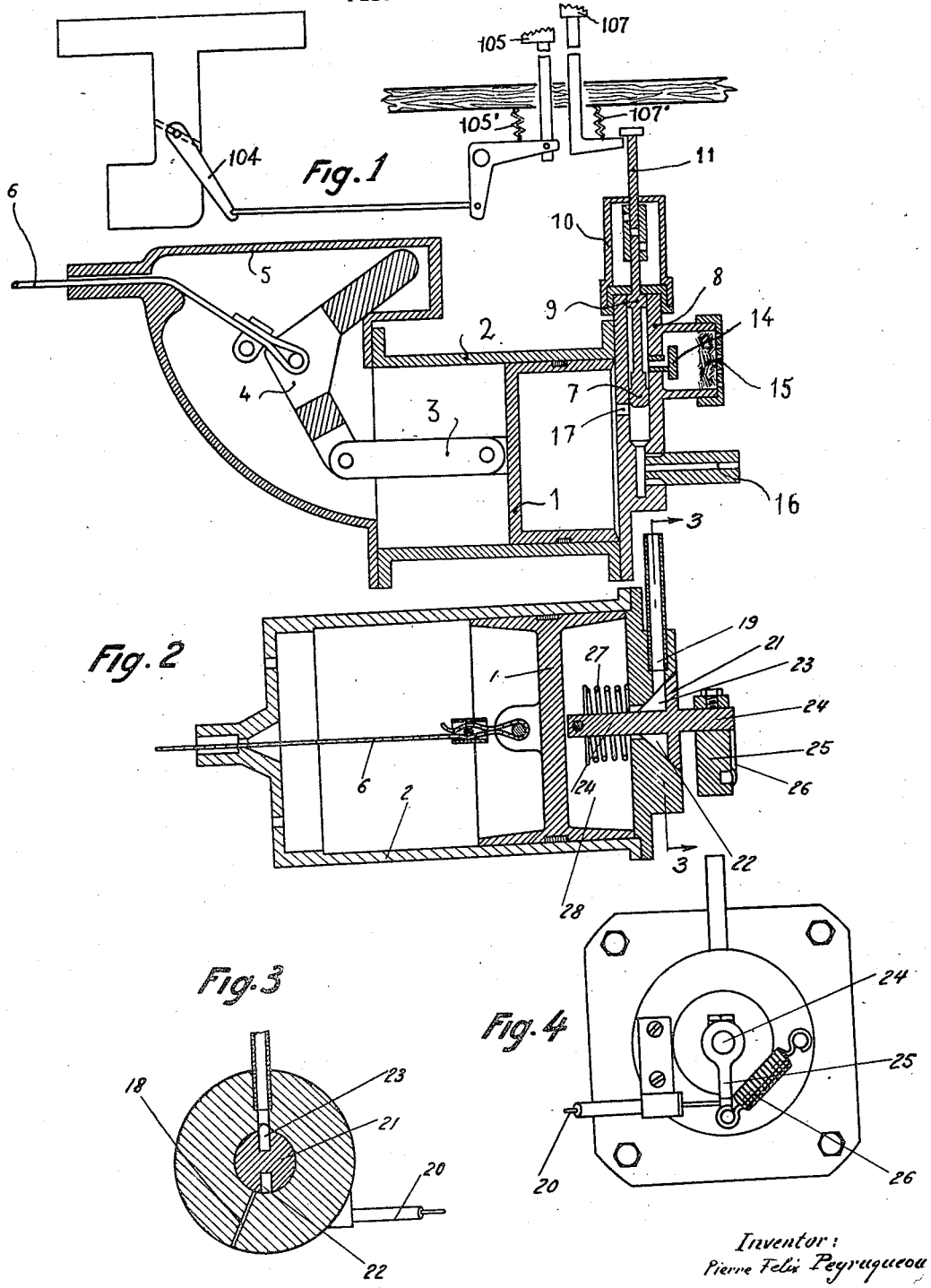

Inventor:
Pierre Félix Peyruqueou
per Fred F. Warson
Attorney

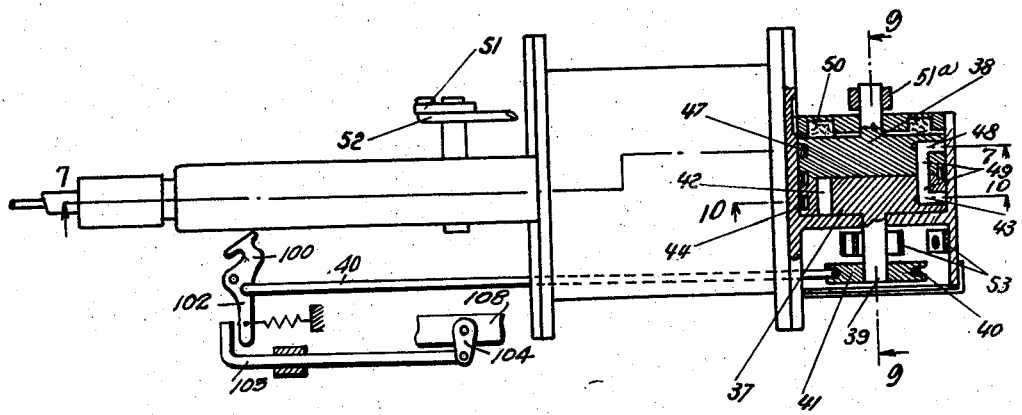
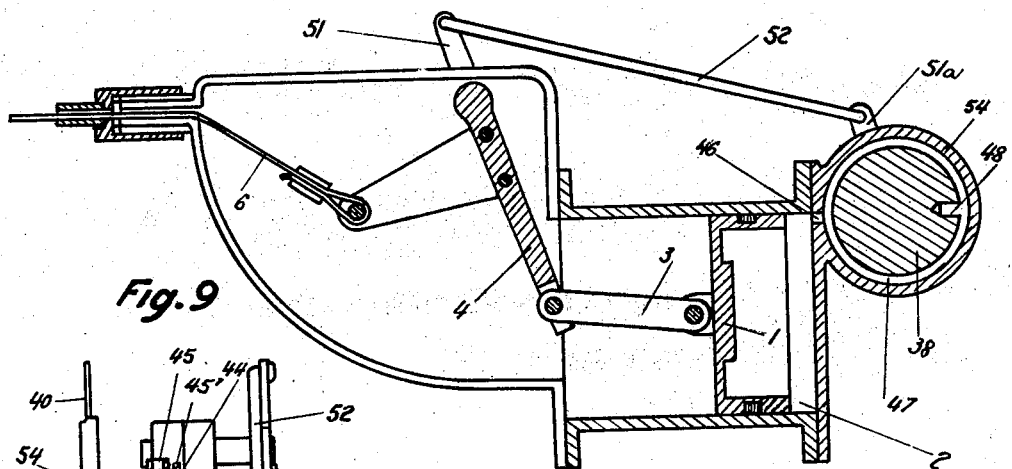
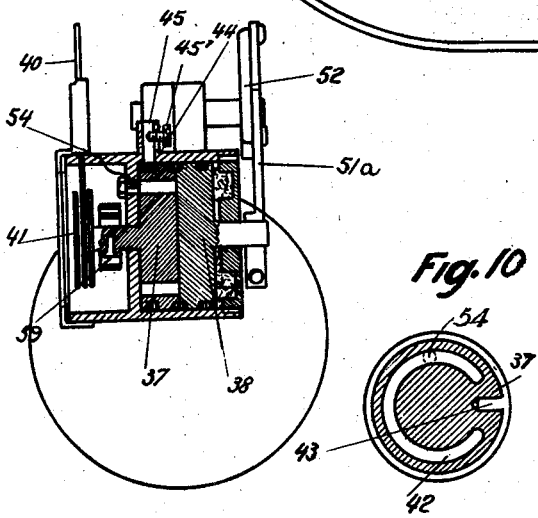

Patented Aug. 8, 1939

2,168,715

UNITED STATES PATENT OFFICE 2,168,715

SERVO-CLUTCH

Pierre Felix Peyruqueou, Mont-de-Marsan, France, assignor to Societe Anonyme des Freins Bendix, Clichy, Seine, France, a société of France Application February 15, 1930, Serial No. 428,783
In France February 22, 1929

10 Claims. (Cl. 192—.01)

The present invention relates to servo-clutches and, more particularly, to those adapted to be used in combination with automobile motors.

One of the objects of the invention is to provide means operative by movement of a motor throttle (accelerator) to throw a clutch into and out of action.

Another object is to provide means operative by the suction exerted by the motor to actuate a clutch.

An additional object is to provide means for varying the rate of release of the clutch.

Further objects will appear in the course of the detailed description now to be given with reference to the accompanying drawings, in which:—

Fig. 1 is a section through one illustrative embodiment of the invention;

Fig. 2 represents, in section, a second form of the invention;

Fig. 3 is a transverse section on the line 3—3, Fig. 2 passing through the suction conduit in Fig. 2;

Fig. 4 is an end view of the structure illustrated in Fig. 2,

Fig. 7 illustrates, in section on the line 7—7, Fig. 8, still another form of the invention;

Fig. 8 is a plan, partially in section, of the combination represented in Fig. 7;

Fig. 9 is an end-view, partially in section on the line 9—9, Fig. 8, of the structure shown in Fig. 7; and Fig. 10 shows one of the discs (Fig. 7) in section on the line 10—10, Fig. 8.

Figure 5:
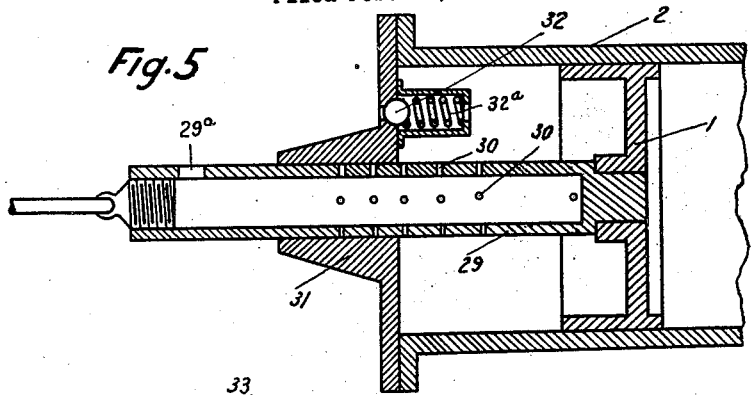
Fig. 5 is a section through a third modification.

Referring to Fig. 1 of the drawings, there is shown a piston 1 slidably mounted in a cylinder 2,—a link 3 pivotally connected at opposite extremities to piston 1 and to an arm 4,—a cable 6 extending from a point intermediate the extremities of arm 4 to a clutch lever or pedal,—a reciprocable valve provided with a thick head portion 7, a reduced stem portion 9, and a tail portion 11 enclosed in casing 10 and connected in any convenient manner to the special pedal,—a conduit 16 connected at one end to the intake manifold of the motor or to any other portion thereof responsive to the suction exerted during operation, and communicating at its other extremity,— subject to the control of valve head 7,—with a passage 17 terminating in cylinder 2,—a calibrated plug 14 positioned to admit air around reduced stem 9,—and an air filter 15 (cotton wool or the like) adapted to clean the air entering plug 14.

Valve head 7 should be dimensioned (1) to obstruct conduit 16, when in lowered position, while permitting air to pass from plug 14, around stem 9, into passage 17, (2) to allow free communication between elements 16 and 17, when in raised position (Fig. 1).

The hereinabove described assembly operates as follows: Assuming the pedal to be in released position, valve head 7 is raised and the suction exerted by the motor by way of conduit 16 is transmitted by way of passage 17 (Fig. 1) to the right hand side of piston 1, drawing the latter to the right and rotating arm 4 so as to exert a pull on cable 6 thereby eliminating the operator's muscular effort for throwing the clutch "out". As soon as the operator presses on the pedal, valve head 7 descends so as to obstruct conduit 16, and air, entering passage 17 by way of plug 14, permits piston 1 to move to the left so as to throw the clutch "in". By giving calibrated plug 14 a proper section, the rate of release of cable 6 may be regulated at will, i. e., the release of the clutch may be made as gradual as desired. Inasmuch as the pedal tends to move upward under the action of springs, or equivalent structures, valve head 7 will tend to follow, and as soon as the pedal is released, valve head 7 will rise and permit the suction in conduit 16 to be transmitted through passage 17 so as to throw the clutch out. The curve described by the point of attachment of cable 6 to arm 4 is such as to yield a variable demultiplication for a constant rate of displacement of piston 1, the maximum effort being exerted when the releasing movement of the clutch terminates.

In the form of device represented in Figs. 2, 3 and 4, the reciprocating type of valve 7, 9, 11 (Fig. 1), is replaced by a rotatary form. Here, piston 1, cylinder 2 and cable 6 have the same structure and function as before (the use of elements 3 and 4 is optional), and the pedal instead of acting on valve stem 11, is connected by a cable, an electromagnetic system (not shown) or any equivalent structure to an arm 25 keyed to shaft 24 of a rotatable cone 21. A conduit 19, connected to the intake manifold, exerts suction on chamber 28, on one side of piston 1, by way of a passage 23 in cone 21 when the latter is in the position corresponding to release of the pedal;

and a second conduit 18, communicating with the air, is positioned to align with a second passage 22 in cone 21 when the pedal is depressed. Conduits 18 and 19 are so positioned that when passage 23 communicates with passage 19, conduit 18 is out of line with passage 22 and vice versa (Fig. 3). A spring 26 tends to rotate cone 21 so as to bring elements 19 and 23 into alignment as soon as the pedal is released and the assembly is completed by a spring 27 correcting wear of cone 21 in its seat. Cone 21 should, preferably, have a spread of 90° but may, of course, form a different angle at its apex.

The operation of this device is very similar to that described for Fig. 1. During idling, elements 19 and 23 align under the action of spring 26, suction from the motor is transmitted to chamber 28, piston 1 moves to the right, and cable 6 throws the clutch out. As soon as the pedal rotates arm 25 so as to move passage 22 and conduit 18 into line, air enters chamber 28 and permits engagement of the clutch. By calibrating bore 18, the rate of engagement of the clutch may be regulated by any suitable means such as a thumb screw, not shown.

The device represented in Fig. 5 is adapted to be used in combination with piston 1 shown in any of the preceding figures and functions to render the engagement of the clutch gradual. Here, cable 6 is connected to a hollow piston rod 29, having an orifice of relatively large section 29a, and a plurality of small orifices 30, formed therein, and cylinder 2 is provided with an air inlet controlled by a ball 32 and a spring 32a. When piston 1 moves towards the right under the action of the suction exerted by the motor, ball 32 unseats and permits air to enter cylinder 2. As soon as air is admitted on the right hand side of piston 1 (by any of the devices shown in Figs. 1 to 4), ball 32 reseats and, as the piston moves towards the left, the total section of orifices 30, controlling the rate of outflow of air, is progressively diminished.

Figure 6:
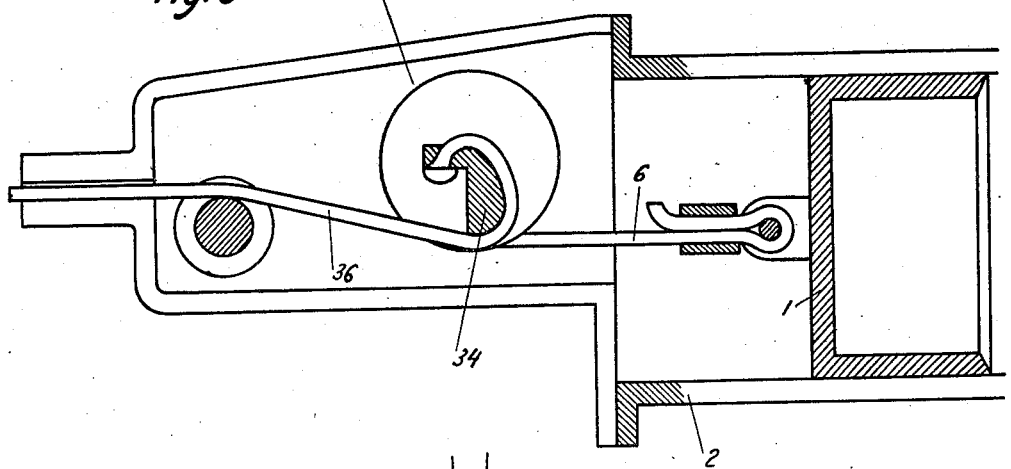
Fig. 6 represents, diagrammatically a fourth constructive embodiment.

Fig. 6 illustrates another arrangement designed to be coupled to piston 1 in Figs. 1 to 4 to obtain progressive engagement of the clutch. The general assembly remains the same as in the latter figures except that cable 6 is wound on a special cam 34 formed on a rotatable disc 33 and profiled to release progressively diminishing lengths of cable for equivalent displacements of piston 1 towards the left.

The form of apparatus shown in Figs. 7, 8, 9, and 10 differs only in details from the one represented in Fig. 1. Arm 4 is here rigidly attached to a lever 51 positioned outside casing 5 and a link 52 transmits the movement of lever 51 to a second lever 51a which functions to rotate a disc 38 having an annular recess 47 formed therein communicating with cylinder 2 via a passage 46 and provided with a transverse passage 49. A second disc 37, coaxial with disc 38, is provided with an annular recess 44, a transverse passage 49, communicating circular passage 42, a shaft 39, a pulley 41 adapted to be rotated by a cable 40 connected to the accelerator pedal, and a spring 53 tending to bring transverse passage 49, 49 in discs 37 and 38 into alignment. Suction from the intake manifold of the motor is transmitted by way of a conduit 45 to annular recess 44, thence by way of conduits 49, 49, 47 and 46 to cylinder 2. As soon as the pedal is depressed, cable 40 rotates disc 37 so as to move an element 42 simultaneously into alignment with a calibrated air inlet 54 having a thumb screw adjustment 54' and with transverse passage 49 in disc 38. Air then enters cylinder 2 and, as arm 4 rotates, lever 51 transmits its movement to lever 51a so as to diminish the section of communication between passages 42 and 49, thus gradually diminishing the rate of movement of piston 1 from right to left.

The invention is not to be taken as limited to the particular combinations shown in any one figure. Thus, the structures for obtaining gradual engagement of the clutch shown in Figs. 5, 6 and 7, may be interchanged with those illustrated in Figs. 1 to 4; similarly the reciprocating type of valve shown in Fig. 1, the conical type in Fig. 2 and the disc type represented in Fig. 8 may be used interchangeably.

Figure 11:
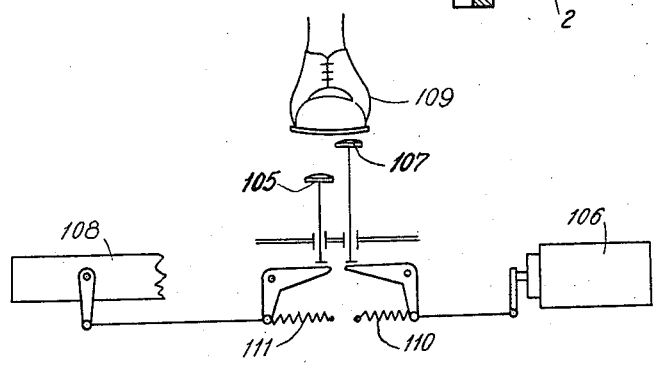
Fig. 11 shows a system employing two pedals at different levels, one actuating the clutching mechanism and the other pedal being the accelerator pedal.

Preferably, the accelerator should be connected to the valve control so that the operations of release of the clutch and acceleration of the motor follow one another and are never superposed. This result may be obtained in either one of two ways: (1) A single pedal may be mounted to have a total course separated into two distinct portions by a small "dead" interval, the first portion of the course serving to release the clutch and the second to accelerate the motor, such as, for example, as shown diagrammatically in Fig. 8. Therein, the throttle controlling member or accelerator pedal 100 is connected to valve 37 through cable 40, the pedal being maintained in normal retracted position by a spring 101. An extension 102 on the pedal is adapted to cooperate with a member 103 connected with a throttle lever 104, the construction being such that the desired lost motion between extension 102 and member 103 is provided; (2) two pedals may be mounted side by side, and close to one another at different heights so that the higher pedal 107 causes operation of the clutch through mechanism 106, while the lower pedal 105 controls the engine throttle. As will be understood from Fig. 11, when the operator's foot 109 descends with pedal 107, the clutch is engaged, and, when his foot encounters the lower pedal 105, the latter is operated to open the throttle 108. Spring return means 110 and 111 are provided respectively for the return of the higher and lower pedals.

In Fig. 1, the return springs 105' and 107', connected respectively to the throttle controlling pedal 105 and clutch pedal 107, function to bias the pedals to their normal retracted positions where the throttle is closed to idling position through operation of lever 104 and the clutch is disengaged.

What I claim is:

1. In a power operated clutch actuating apparatus for motor cars and like uses, comprising a movable clutch controlling member, fluid pressure power mechanism for actuating said member, valve mechanism controlling said fluid pressure, and a pedal having an operative connection to the throttle controlling device of the car motor, the combination, with said above-described apparatus, of means automatically actuated synchronously with said clutch controlling member for operating said valve mechanism to arrest the movement of said member whenever the movement of said throttle controlling pedal is arrested.

2. In a power operated clutch actuating apparatus for motor cars and like uses, comprising a movable clutch controlling member, fluid pressure power mechanism for actuating said member, valve mechanism controlling said fluid pressure, and a pedal having an operative connection to the throttle controlling device of the car motor, the combination, with said above-described apparatus, of means automatically actuated synchronously with said clutch controlling member for operating said valve mechanism to arrest the movement of said member upon partial release of said throttle controlling pedal.

3. In an automotive vehicle provided with a clutch and an accelerator, power means for operating the clutch comprising a power actuator operatively connected to the clutch, said actuator comprising relatively movable parts, and means for so controlling the operation of the clutch as to effect a step-by-step disengagement thereof, said means comprising the accelerator and a movable element of said actuator.

4. In a power activated mechanism for actuating the clutch which connects or disconnects the traction wheels of a motor car to or from a throttle controlled engine for propelling such car, the combination with an accelerator which controls such throttle and a member for actuating said clutch, of a servo motor operatively connected to said member and a device for controlling said servo motor which includes apparatus adapted to be so energized contemporaneously with changes in the adjustment of said accelerator that, after the latter has been shifted in one direction far enough to cause a clutch closing operation of said servo motor to an extent sufficient to produce only an incomplete clutch engaging movement of said member, said movement will be automatically arrested whenever the shifting movement of said accelerator is stopped.

5. In a power activated mechanism for actuating the clutch which connects or disconnects the traction wheels of a motor car with a throttle controlled engine for propelling such car, the combination with an accelerator which controls such throttle and a member for actuating said clutch, of a servo motor operatively connected to said member, and a device for controlling said servo motor which includes apparatus adapted to be so energized contemporaneously with changes in the position of said accelerator that, after the latter has been shifted in either direction far enough to cause operation of said servo motor to an extent sufficient to produce only an incomplete clutch disengaging or engaging movement of said member, either of said movements will be arrested whenever the shifting movement of said accelerator is stopped.

6. In a power transmission system for motor vehicles, an internal combustion engine, an engine accelerator, a clutch, a fluid pressure motor for operating said clutch, a source of fluid pressure, a conduit connecting said motor and source, and follow-up valve means interposed in said conduit for controlling the energization of said motor, said valve means including a part operated upon movement of the engine accelerator and a second part cooperating with the first part and movable by operation of said clutch.

7. In a power transmission system for motor vehicles, an internal combustion engine, an engine accelerator, a clutch, a fluid pressure motor for operating said clutch, a source of fluid pressure, a conduit connecting said motor and source, and follow-up valve means interposed in said conduit for controlling the energization of said motor, said valve means including means operatively connected with said accelerator and clutch whereby the degree of energization of said motor may be controlled in accordance with the extent of movement of said accelerator.

8. Clutch operating mechanism for motor vehicles including a clutch and a throttle operating member for the vehicle engine comprising a power device connected to the vehicle clutch, and control means operative upon movement of the engine throttle operating member toward normal retracted position for rendering the power device operative for disengaging the clutch, and operative upon movement of the throttle operating member in the opposite direction for successively releasing the clutch elements for movement toward operative engagement, checking the movement of the clutch elements at a point prior to operative engagement, and then further releasing the clutch elements for movement into operative engagement, said control means including a member connected to the engine throttle operating member and movable in one direction upon movement of the throttle operating member toward normal retracted position and in the other direction upon movement of the throttle operaing member in said opposite direction, and a second member movable in accordance with the degree of actuation of the power device, such second member being movable in said one direction upon the actuation of the power device and in said other direction upon the deactuation of the power device, said second named member being movable in the last named direction into cooperative relationship with the first named member to check the releasing of the clutch elements.

9. Clutch operating mechanism for motor vehicles including a clutch and a throttle operating member for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle operating member in one direction for connecting the power device to the source of differential pressure to disengage the clutch, and operative upon movement of the throttle operating member in the opposite direction for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a valve controlled by the engine throttle operating member and movable in one direction upon movement of the throttle operating member in said one direction and in the other direction upon said opposite movement thereof, and a second valve movable in accordance with the degree of actuation of the power device, said second named valve being movable in said first named direction upon actuation of the power device and in the second named direction upon the connection of the power device to the atmosphere to release the power device, said second named valve being movable in the last named direction to tend to assume a neutral relationship with the first named valve to disconnect the power device from the atmosphere and check the releasing of the clutch elements.

10. Clutch operating mechanism for motor vehicles including a clutch and a throttle operating member for the vehicle engine comprising a pressure responsive power device connected to a motor vehicle clutch and operative for moving the clutch elements out of engagement with each other, and control means for determining the connection of said power device with a source of differential pressure and the atmosphere, said control means being operable upon movement of the engine throttle operating member in one direction toward normal position for connecting the power device to the source of differential pressure to disengage the clutch, and operative upon movement of the throttle operating member in the opposite direction for variably connecting the power device to the atmosphere for successively releasing the clutch elements for movement toward operative engagement, checking the movement of the clutch elements at a point prior to operative engagement, and then further releasing the clutch elements for movement into operative engagement, said control means including a pair of cooperating valves, one controlled in accordance with the position of the engine throttle operating member and the other in accordance with the degree of actuation of the power device, said first named valve being movable in said one direction to connect the power device to the source of differential pressure and in said opposite direction to connect the power device to the atmosphere, said second named valve being movable in said first named direction upon actuation of the power device and in the second named direction upon the connection of the power device to the atmosphere, said second named valve being movable in said last named direction to tend to assume a neutral position with respect to said first named valve to disconnect the power device from the atmosphere and the source of differential pressure to check the releasing of the power device.

PIERRE FELIX PEYRUQUEOU.